United States Patent [19]
Schneider

[11] Patent Number: 5,177,969
[45] Date of Patent: Jan. 12, 1993

[54] THERMOCHEMICAL ACTUATION METHOD AND APPARATUS

[76] Inventor: Edward T. Schneider, 8729 Hilltop, Mentor, Ohio 44060

[21] Appl. No.: 682,423

[22] Filed: Apr. 8, 1991

Related U.S. Application Data

[63] Continuation-in-part of Ser. No. 402,616, Sep. 5, 1989, Pat. No. 5,025,627.

[51] Int. Cl.⁵ .............................................. F03G 7/06
[52] U.S. Cl. ...................................................... 60/527
[58] Field of Search .......................... 60/527, 530, 531

[56] References Cited

U.S. PATENT DOCUMENTS

| | | | |
|---|---|---|---|
| 2,215,157 | 9/1940 | Platzner | 60/527 |
| 3,475,904 | 11/1969 | Hayes | 60/23 |
| 3,953,973 | 5/1976 | Cheng et al. | 60/527 X |
| 4,235,075 | 11/1980 | Erb | 60/527 |
| 4,253,304 | 3/1981 | Lamb et al. | 60/527 |
| 4,258,899 | 3/1981 | Huelle et al. | 251/11 |
| 4,318,529 | 3/1982 | Huelle et al. | |
| 4,323,220 | 4/1982 | Huelle et al. | 251/11 |
| 5,025,627 | 6/1991 | Schneider | 60/527 |

FOREIGN PATENT DOCUMENTS

| | | |
|---|---|---|
| 2408049 | 1/1979 | France . |
| 2095338A | 3/1982 | United Kingdom . |
| 2114741A | 8/1983 | United Kingdom . |

*Primary Examiner*—Allen M. Ostrager
*Attorney, Agent, or Firm*—Fay, Sharpe, Beall, Fagan, Minnich & McKee

[57] ABSTRACT

A pressure vessel (A) is defined by end walls (16) and side walls (18). In the interior, a plurality of fins (12) define an assembly of thin passages (10) that are filled with a material (26) that expands as it changes from a solid to a fluid state. The passages are thin, on the order of 0.01 inches such that heat is transferred relatively quickly into and out of the material. The passages communicate with a manifold area (14) to a piston bore (40) or other structure (B) for converting fluid pressure into mechanical movement. The piston bore holds a low durometer seal (44), a higher durometer seal (46), and a movable piston (42). To generate rotary motion, the piston and vessel assembly are mounted for rotation about an eccentrically placed member (68). As the pressure vessel goes through heating and cooling reservoirs, the pistons expand and contract causing rotation (FIGS. 4–6). In another application, at least two of the assemblies are interconnected by a heat pump (74) such that heat can be moved back and forth between the two. Additional heat pumps are provided for moving heat from the ambient air or other sources of heat to the pressure vessels (FIG. 7). The actuator is also used to control a two position valve (FIG. 9) and a three position valve (FIG. 10). A pair of actuator vessels (160, 162) are connected by a common heat transfer device (164) for causing differential movement between pistons (166, 168), (FIG. 12).

20 Claims, 9 Drawing Sheets

THERMOCHEMICAL ACTUATION METHOD AND APPARATUS

The present application is a continuation-in-part of U.S. patent application Ser. No. 402,616 filed Sep. 5, 1989, now U.S. Pat. No. 5,025,627.

BACKGROUND OF THE INVENTION

The present invention relates to mechanical power supplies. It finds particular application in conjunction with creating a high pressure fluid for extensible piston actuators and will be described with particular reference thereto. However, it is to be appreciated that the invention will also find application in conjunction with other high pressure fluid systems, as well as, other mechanical power supplies, such as solenoid type actuators, pumps, motors, valve controllers, and the like.

Heretofore, various sources of mechanical power have been provided. Solenoids are a common extensible actuator. Although solenoids are relatively simple to control and relatively inexpensive, they have several drawbacks. First, solenoids produce relatively little force for their physical size. Second, solenoids generate relatively small starting forces, i.e. they do not generate full force from a dead start. Even once extended, solenoids require full power to remain in their actuated state. Further, under low voltages or marginally higher loads, solenoids stall or fail to pull. Third, the inductive coil can generate RF interference that interferes with electronic control circuitry. Also, solenoids tend to be noisy. They "clack" when pressed open and tend to chatter or buzz under heavy loads.

Electric gear motors are less easy to control than solenoids but produce more force for their physical size. However, gear motors, particularly AC operated gear motors, tend to induce RF interference which interferes with control circuitry. Like a solenoid, gear motors do not start at full force. Gear motors can stall under high start up load conditions. Gear motors tend to be relatively slow. Like solenoids, when first actuated, gear motors draw a large initial surge current. Gear motors tend to be noisy, making a growling sound as they operate.

For higher power densities, hydraulic actuators are commonly utilized. However, the control lines, pumps, fluid reservoirs, pressure regulators, and other associated support devices render hydraulic and pneumatic cylinder assemblies complex to use and space inefficient. Moreover, hydraulic systems tend to be dangerous in a failure mode. When the high pressure fluids are unexpectedly released, the pressure is sufficiently great that they can penetrate or break surrounding structures, injure human attendants either directly and though high pressure oil induced blood poisoning, or the like. Moreover, hydraulic systems tend to be associated with an undesirable whine.

The present invention contemplates a new and improved actuator which overcomes the above-referenced problems and others.

SUMMARY OF THE INVENTION

In accordance with the present invention, a pressure vessel construction is provided. The vessel defines a plurality of thin paths filled with a compound that controllably changes phases. The paths are defined by a plurality of thin structures arranged to optimize heat transfer with the phase change compound.

In accordance with a more limited aspect of the present invention, every point within the thin paths is within 0.010 inches of a fin structure. Preferably, all molecules of the compound are within 0.005 inches of the heat transfer structure.

In accordance with another more limited aspect of the present invention, the vessel and heat transfer structure are constructed of a material which has a thermal conductivity exceeding 70 BTU/hr. ft. °F. and preferably at least 140 BTU/hr. ft. °F.

In accordance with another more limited aspect of the present invention, a core vessel material has a tensile strength exceeding 50,000 PSI. Preferably, the vessel is a beryllium copper that is heat-treated to a state in which it has at least 95,000 PSI tensile strength.

In accordance with another more limited aspect of the present invention, the outer wall thickness is at least twice the thin path thickness.

In accordance with another more limited aspect of the present invention, the pressure vessel has a strength exceeding 5,000 PSI, preferably at least 30,000 PSI.

In accordance with another aspect of the present invention, the pressure vessel is interconnected with a fluid pressure mechanical work means for converting the fluid pressure into mechanical work.

In accordance with more limited aspects of the present invention, the fluid pressure mechanical work means includes extensible pistons, pressure domes, valve actuators, motors, and the like.

In accordance with another more limited aspect of the present invention, a means introduces heat into the pressure vessel to cause the phase change compound to change from a solid to a fluid state and for withdrawing heat from the pressure vessel to cause the phase change compounds to solidify.

In accordance with another more limited aspect of the present invention, the heat is supplied to and removed from the pressure vessel by a heat pump. More specifically to the preferred embodiment, two pressure vessels each have a vapor coil which are interconnected by a reversible compressor and an expansion valve. The compressor is selectively reversible such that either coil may function as the evaporator as the other functions as the condenser. In this manner, heat is selectively moved back and forth between the two pressure vessels.

In accordance with another aspect of the present invention, the pressure vessels move between hot and cold reservoirs alternately. Peltier chips and other means for adding or removing heat are also contemplated.

In accordance with another more limited aspect of the present invention, the fluid-mechanical means includes an extensible piston assembly and further including an extension monitoring means. A means is provided for adding and removing heat from the pressure vessel in order to maintain the piston assembly substantially at each of a plurality of monitored, preselected set points.

In accordance with another aspect of the present invention, pairs of the pressure vessels are mounted with pistons in opposing relationships. Each piston is interconnected with feedback sensors for measuring relative extension and force.

One advantage of the present invention resides in its high power density.

Another advantage of the present invention is its flexibility and simplicity of operation.

Still further advantages of the present invention reside in its silent operation, its relative freedom from stallout, the elimination of RF interference by the use of DC control currents, reduced power consumption to maintain an extended state, adaptive peak force level that automatically adapts to the application, and reliability of service even over a large number of repetitions.

Still further advantages of the present invention will become apparent to those of ordinary skill in the art upon reading and understanding the following detailed description.

BRIEF DESCRIPTION OF THE DRAWINGS

The invention may take part in various components and arrangements of components, and in various steps and arrangements of steps. The drawings are only for purposes of illustrating the preferred embodiment and are not to be construed as limiting the invention.

DETAILED DESCRIPTION OF THE PREFERRED EMBODIMENTS

Figure 1:
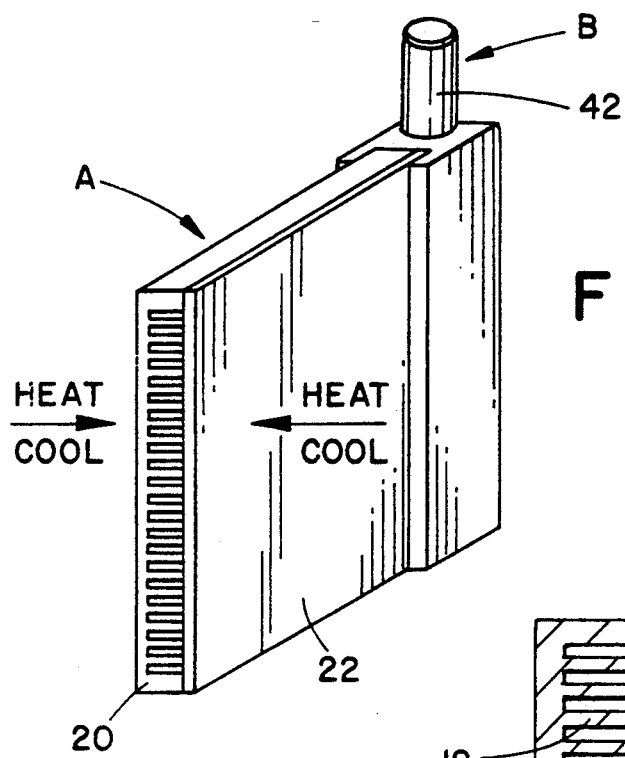
FIG. 1 is a perspective view in partial section of an actuator including a fluid pressure generating vessel and fluid pressure to mechanical motion converter in accordance with the present invention.
Figure 2:
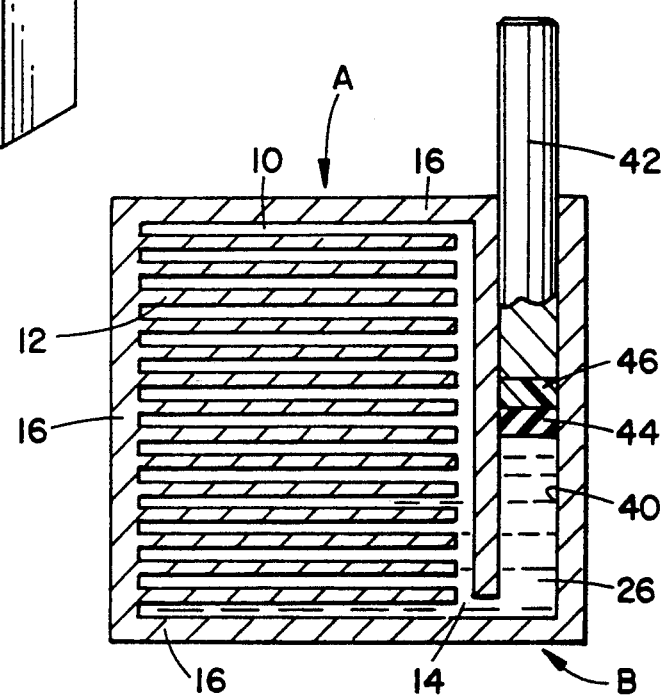
FIG. 2 is a longitudinal sectional view of the system of FIG. 1.
Figure 3:
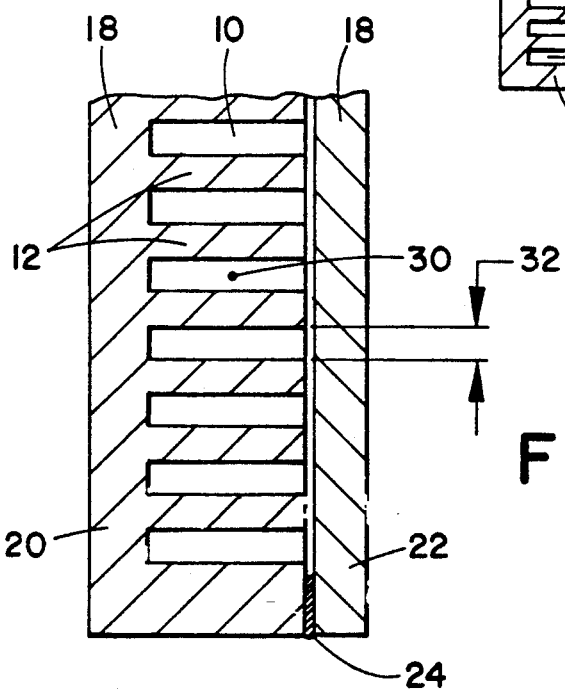
FIG. 3 is an enlarged transverse sectional view of a portion of the pressure vessel portion of FIG. 1.

With reference to FIGS. 1, 2, and 3, a pressure vessel means A selectively generates a high pressure fluid which is converted into mechanical movement by a fluid pressure-mechanical motion converting means B. The pressure o vessel means includes a multiplicity of thin paths 10 defined by a multiplicity of heat carrying and structural strength providing members or fins 12. The thin paths merge at a manifold area 14 which is interconnected with the fluid pressure to mechanical movement generating means The pressure vessel is further defined by relatively strong end walls 16 and strong, readily heat conductive faces 18. In the preferred embodiment, the thin paths 10 are cut in a single block 20 leaving three end walls 16, one face 18, and fins 12 all integrally connected. The second of faces 18 is defined by a plate 22 that is brazed by silver braze 24 to the end walls and the fins. The brazing not only provides effective heat transfers, but provides with the fins and opposite face an I-beam like structure for pressure stability.

More specifically, the pressure vessel is designed to optimize heat transfer into and out of a phase change material 26, such as a wax or polymer, that fills the thin paths and manifold area of the pressure vessel. To this end, the pressure vessel is constructed of a high thermal conductivity metal, such as beryllium copper that is alloyed to have a conductivity of at least 140 BTU/hr. ft. °F. In each path, there is a point 30 which is most remote from a thermally conductive fin or metal portion. It is advantageous to make point 30 as close as possible to one of the fins or conductive surfaces. To this end, a minimum dimension 32 of the thin paths is less than 0.010 inches, at preferably less than 0.005 inches. Because most phase change materials tend to have relatively poor thermal conductivity properties relative to the thermal conductivity properties of the fins and housing, it is desirable for the minimum dimension to be only the thickness of a few molecules of the phase change material. Alternately, additional heat conductive structures can be provided for carrying heat into the thin paths more quickly. For example, thin wires or rods could extend transversely through the thin paths to improve heat transfer. As yet another alternative, the chambers may be partially filled with a porous, highly thermally conductive material such as a highly thermally conductive foam, a sintered thermally conductive material, or the like. As yet another alternative, thermally conductive particles may be suspended in the material.

The end walls 16 and faces 18 are at least as thick as the width of the thin paths and preferably at least twice as thick and of heat treated beryllium copper which has a tensile strength of 95,000 PSI. Materials with a higher tensile strength may enable the walls to be thinner, as may a willingness to work at lower pressures. Conversely, when using materials with less tensile strength, thicker walls will achieve the same vessel strength. Preferably, the overall vessel has the capacity to hold an internal pressure of 30,000 PSI. However, for some applications, only lower internal pressures are generated.

The use of fins or other heat conductive structures is provided to define a long, thin path or plurality of interconnected path segments. In an embodiment in which the pressure vessel is about 1½" square, about 75 1½" long path segments each having a width of 0.01" are provided. This provides a path width to length ratio of about 11,000:1. Preferably, the path length to minimum width ratio is at least 10,000:1.

The fluid pressure to mechanical movement converting means B includes a bore 40 in which a piston 42 is slidably received. Preferably, the piston and piston bore are of high strength materials, such as metal. To prevent fluid from flowing between the piston and piston bore under the high pressures generated, a low durometer seal member, such as a soft rubber disk 44 is slidably mounted in the bore 40 between the piston 42 and the fluid 26. Under the very high pressures generated, there is a tendency for the low durometer seal to flow partially in between the piston and the bore. Accordingly, a higher durometer seal member, such as a nylon or teflon disk 46, is interposed between the low durometer member and the piston. The higher durometer seal deforms sufficiently under pressure that it is pressed into sufficient conformity with the bore that the low durometer seal cannot move flow therebetween. Yet, the higher durometer seal has sufficient stiffness that the pressure does not cause the higher durometer seal to flow between the piston and the bore. Optionally, additional intermediate durometer members may be interposed, as necessary, to assure that the fluid 26 is restrained by the lowest durometer seal and that the shape integrity of each seal is maintained.

Of course, other pressure to mechanical movement devices are also contemplated. For example, a snap dome may be utilized instead of the piston. A snap dome is advantageous in that a fluid tight seal can be made between the edges of the dome and the vessel. Bellows type expansible chambers can also be utilized. As another alternative, the low durometer seal may interface with the phase change compound 26 on one side and a second fluid to be pressurized or compressed at the other. In this manner, pumping or pressurizing of a fluid is achieved without intervening mechanical members.

Although the fluid pressure to mechanical movement means B is illustrated as being at one end of the pressure vessel A, other arrangements are contemplated. For example, a second pressure reservoir may be connected to an opposite side of the piston bore and fluidly interconnected with the manifold area. Additional pressure vessels can also be interconnected at various angles with the manifold area. As yet another alternative, the manifold area may be defined in the brazed-on end plate 22 in a generally central region thereof. Conversely, a second fluid pressure to mechanical motion converting means can be connected with the pressure vessel. If the fluid pressure to mechanical motion converting means each include a piston, the pistons extend with equal pressure, but not necessarily equal travel. Numerous other placements of the pressure to mechanical motion converting means B relative to the pressure vessel A are also contemplated as may be appropriate to the application.

The phase change compound can be any of a wide variety of compounds which change dimension as they undergo a generally isothermal phase change between liquid and solid phases. The compound preferably increases about 10%-15% in volume am it changes from its solid to its liquid state. It is to be appreciated that the invention functions analogously, but inversely, with a compound that expands as it solidifies. By using a generally isothermal phase change, the compound can be expanded and contracted, i.e. moved back and forth between its solid and liquid states, by using heating and cooling sources that are only a couple of degrees apart. A suitable compound is a wax that melts at 125° F. Other polymers and substances are also contemplated.

Figure 5:
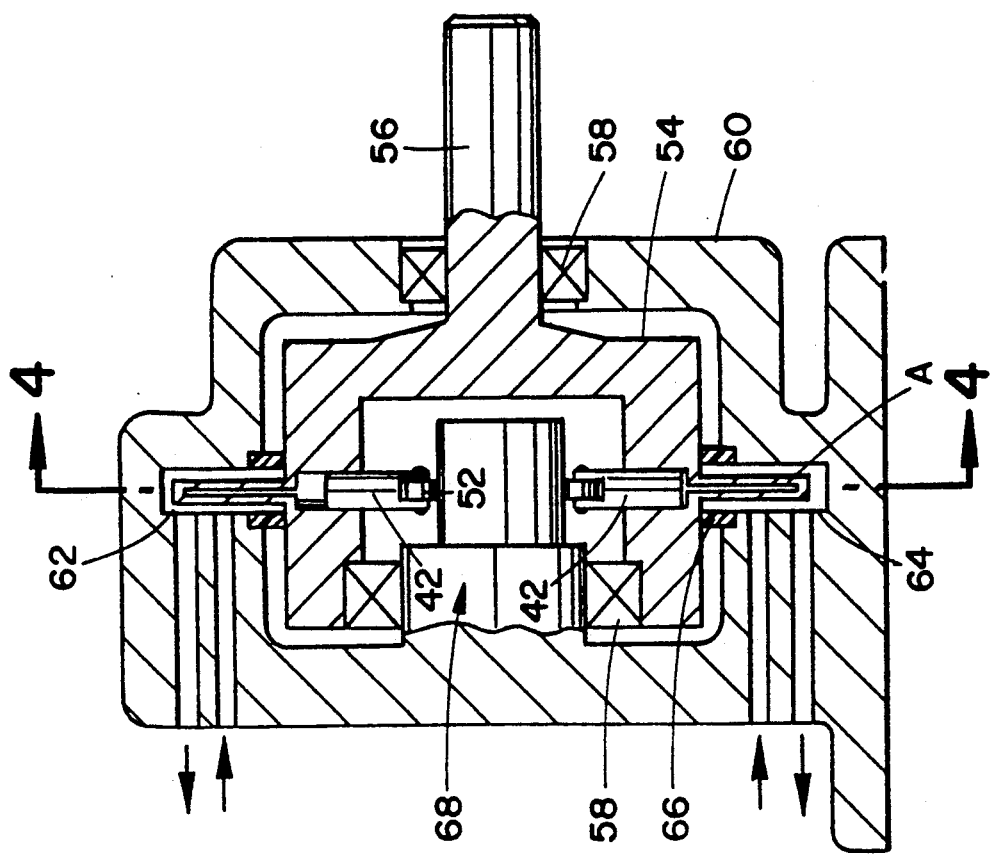
FIG. 5 is a side sectional view of the motor of FIG. 4.
Figure 4:
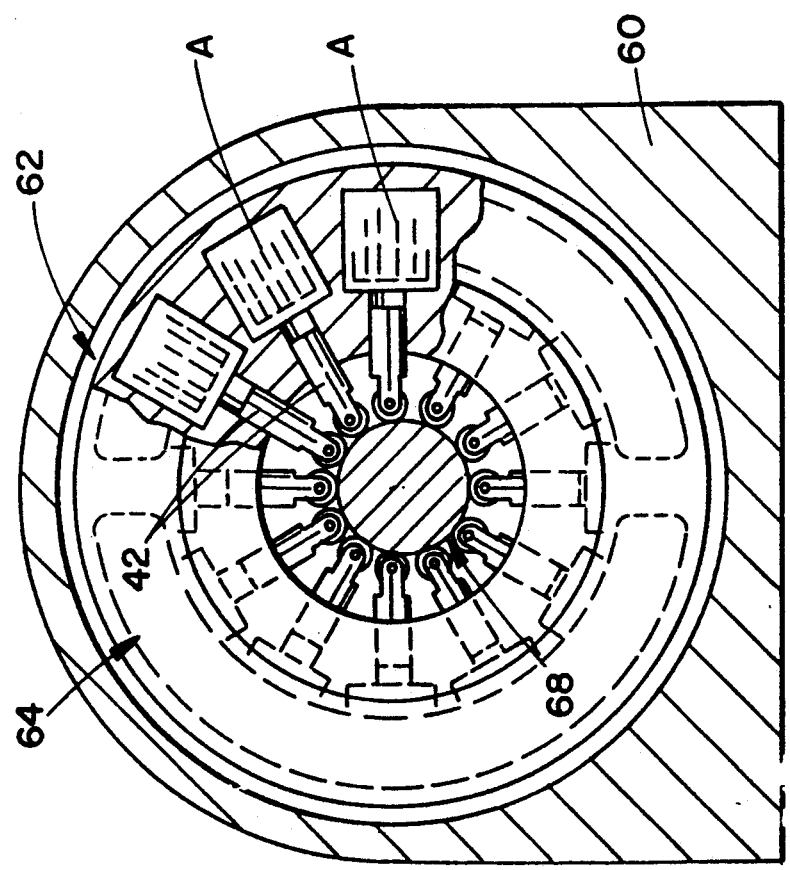
FIG. 4 is a sectional view of a motor employing a plurality of the actuators of FIG. 1.
Figure 6:
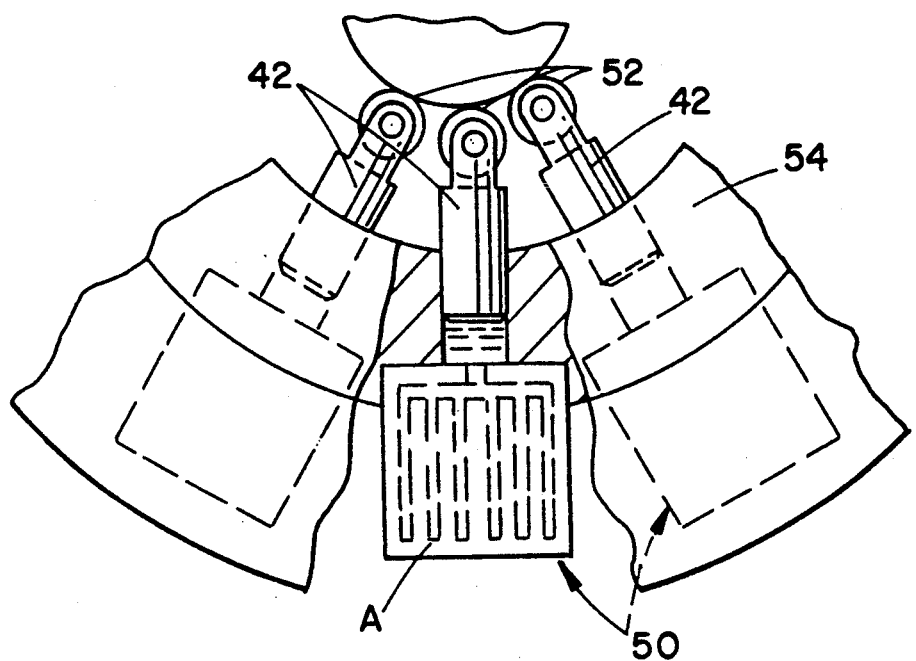
FIG. 6 is an enlarged transverse sectional view illustrating actuator mounting.

With reference to FIGS. 4, 5, and 6, a rotary motor is configured with a plurality of the actuators of FIG. 1. Specifically, a plurality of actuators 50 with rollers or cam surfaces 52 on the ends of the pistons 42 are mounted to a movable member 54, e.g. a ring. The fluid vessels extend radially outward from the ring 54. The ring and actuators are mounted to an output shaft 54 which is mounted by bearings 58 in a stationary housing 60.

The housing 60 defines an arcuate hot water bath or heating reservoir 62 and an arcuate cold water bath or cooling reservoir 64. The reservoirs each extend generally along a half circle. Fluid seals 66 are provided between the hot and cold water baths to block intermixing of the hot and cold water while allowing the pressure vessels to move therethrough. The rollers on the ends of the pistons engage an eccentric member 68 which is mounted to the stationary body 60. The eccentric member is mounted offset closest to one junction between the hot and cold water baths. When a pressure vessel first enters the hot water bath, the compound starts changing from its solid to its liquid state causing the piston to extend. Extension of the piston against the stationary eccentric member forces the actuator to move to a position where it is more remote from the eccentric member, i.e. rotate counterclockwise in the illustrated embodiment. As the fluid chamber becomes warmer, the piston extends still further until it reaches its point of maximum extension at the other interface between the hot and cold water baths. Once in the cold water bath, the composition starts to solidify, retracting the piston and allowing continued rotation about the eccentric member.

Figure 7:
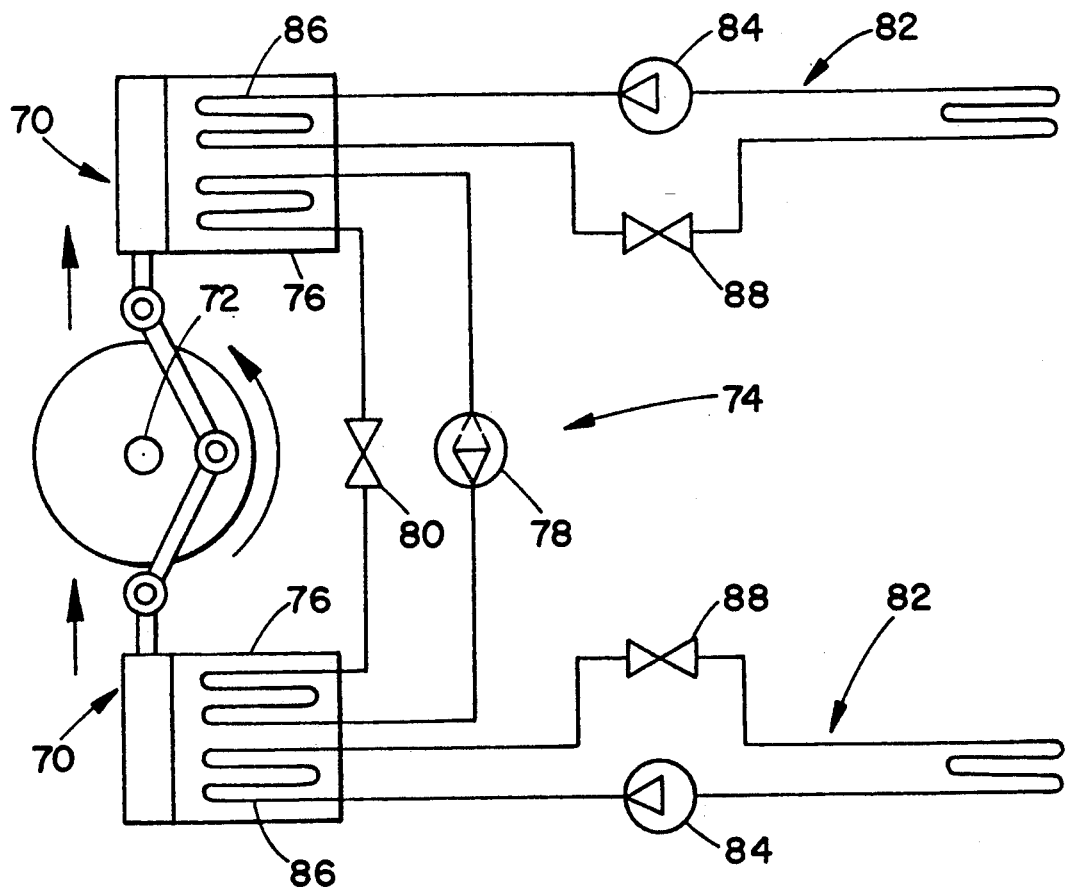
FIG. 7 illustrates an alternate embodiment of a motor utilizing a vapor phase heat pump.

With reference to FIG. 7, rotary motion can also be produced by a pair of oppositely mounted stationary actuators 72. The piston 42 of each actuator is pivotally connected with a rotatably mounted crankshaft 72. A heat transfer means 74, preferably a vapor phase heat pump, transfers heat alternately between the two actuators causing them to cycle out of phase. Each actuator includes a coil 76 which is able to function as either an evaporator coil or a condenser coil. A reversible compressor or valve arrangement 78 for reversing flow pumps heat from one actuator to the other during about 180° rotation of the crankshaft. During the second 180° of rotation of the crankshaft, the compressor reverses and pumps the heat in the other direction. More specifically, freon gas is compressed by the compressor. The compressing elevates the temperature of the compressed gas or freon liquid, which hot freon liquid carries heat to one of the coils which is functioning as a condenser. The condenser coil heats the associated actuator. An expansion valve so allows the freon liquid to evaporate, it adsorbs heat, becoming cold. The cold freon gas flows through the other of coils 76 which is functioning as a condenser coil, removing heat from the other actuator. Once 180 of rotation is completed, the compressor reverses, reversing which of coils 76 functions as the condenser and which functions as the evaporator. In this manner, heat is moved in the other direction. Because a heat pump works most efficiently when moving heat between two reservoirs of substantially the same temperature, the heat pump system works near optimal efficiency.

A pair of additional heat transfer means 82, preferably vapor phase heat pumps, are provided to replace heat losses at the two actuators. Specifically, each of the heat pumps 82 include a compressor 84 which selectively compresses freon removing heat from the ambient air or other heat source and discharging it into the associated actuator through a condenser coil 86. An expansion valve 88 allows the freon liquid to expand to the gaseous state, absorbing heat from the ambient air. If the ambient air or other reservoir from which heat is removed is close to the working temperature of the actuators, the heat pump 82 again works at high efficiency.

Figure 8:
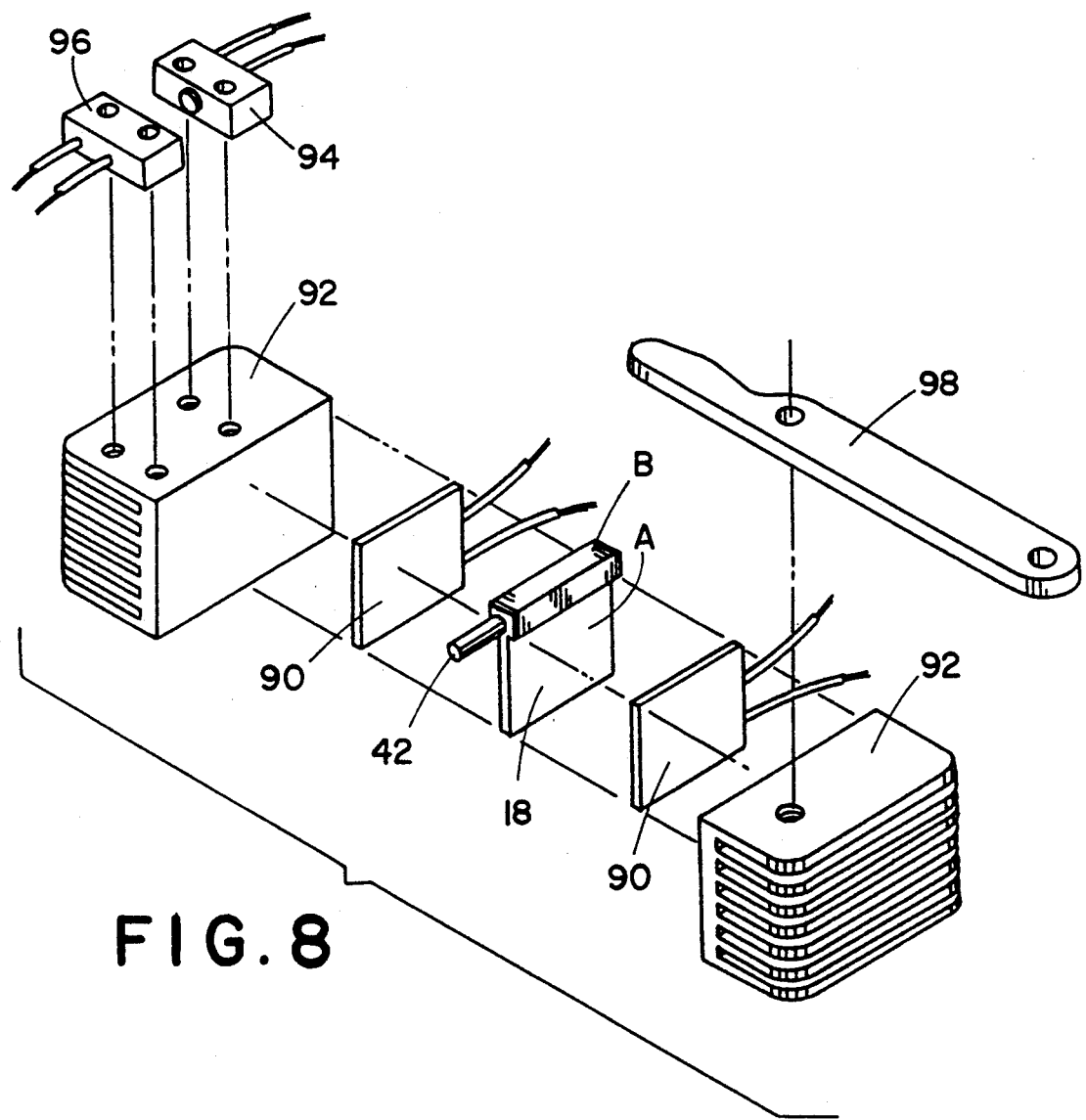
FIG. 8 is an exploded view of another alternate embodiment of the present invention using thermoelectric heating and cooling means.

With reference to FIG. 8, thermoelectric chips 90, such as peltier chips, are placed against faces 18 of the pressure vessel. Heat sinks, such as an array of fins 92 are mounted to opposite sides of the thermoelectric chips. The thermoelectric chips efficiently move heat from the ambient air into the pressure vessel A and from the pressure vessel back out to the ambient air. High and low travel limit switches 94, 96, respectively, monitor for the piston to reach first and second degrees of extension. The first and second degrees of extension may be fully extended and fully retracted configurations. Alternately, the two degrees of extension may be half and fully extended states, or the like.

In the illustrated embodiment, the piston 42 engages a lever 98 which is cammed about a pivot point. The lever is interconnected at one end with associated equipment which is to be powered. The other end of the lever engages the limit switches 94, 96.

Figure 9:
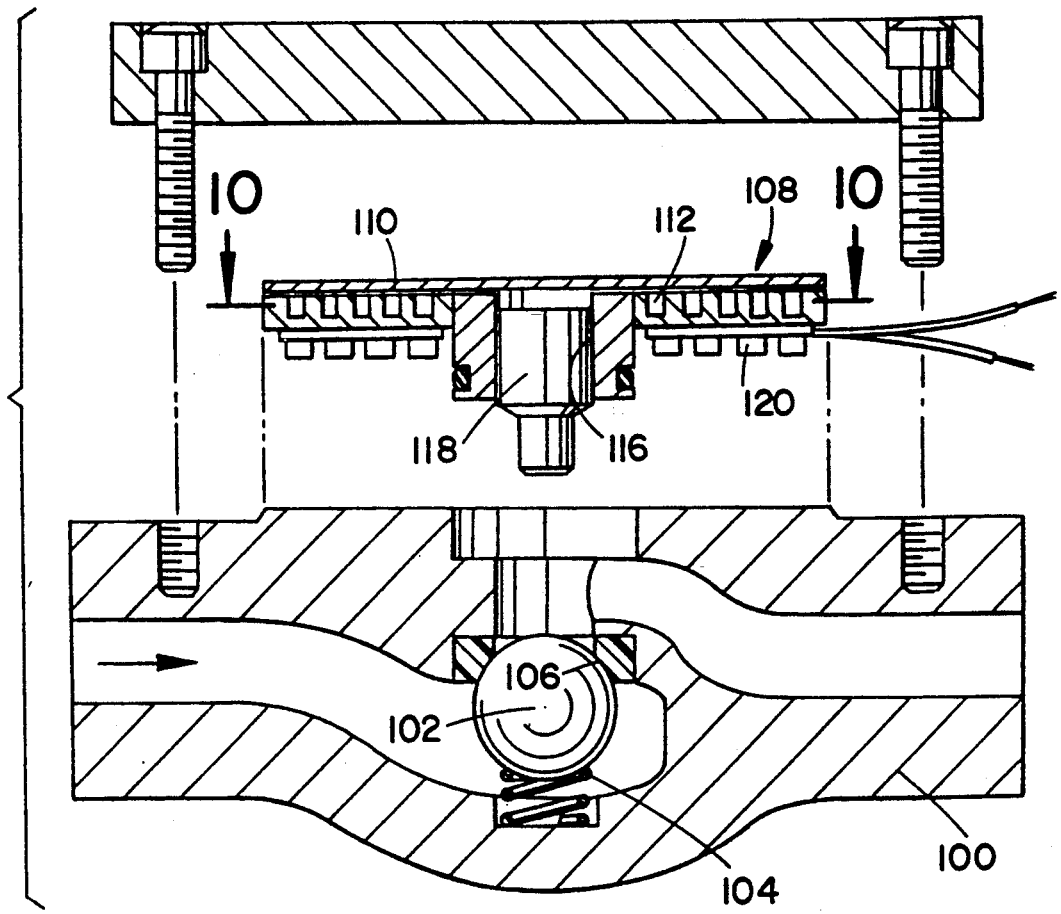
FIG. 9 illustrates a valve assembly incorporating an actuator analogous to that of FIG. 1 utilizing Peltier heating and cooling.
Figure 10:
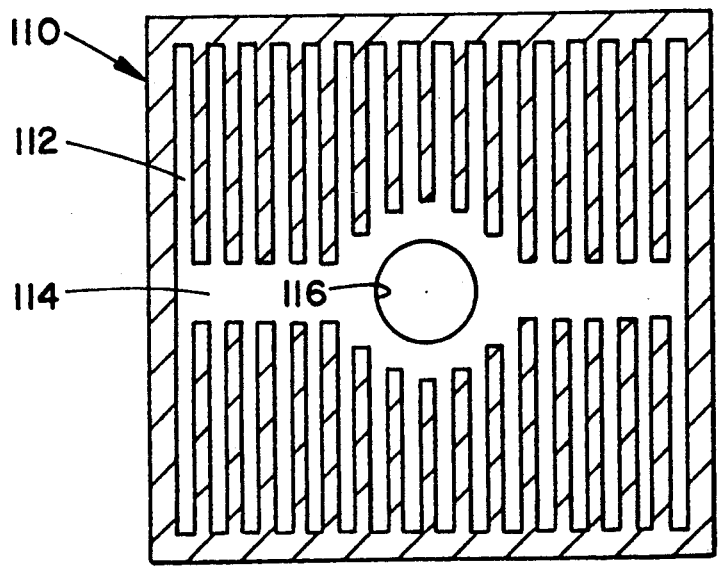
FIG. 10 is a sectional view through the pressure vessel of the actuator of FIG. 9.

With reference to FIGS. 9 and 10, a valve body housing 100 has a valve member 102 biased by a spring 104 across a valve seat 106. In the preferred embodiment, fluid under pressure from an inlet end assists the spring in biasing the valve member 102 against the valve seat 106. An actuator 108 selectively moves the valve member away from the valve seat to permit fluid flow through the valve.

The actuator includes a pressure vessel 110 of substantially the construction illustrated in FIGS. 1-3. That is, a multiplicity of small passages or thin passages 112 filled with the phase change composition funnel to a manifold area 114. The manifold area connects with a bore 116 in which a piston 118 is mounted. A heat transfer means 120, such as a Peltier chip, selectively adds or removes heat from the pressure vessel 110. Depending on the temperature of the fluid flowing through the valve, the fluid in the valve can be used either add or remove heat from the pressure vessel. For example, if cool water flows through the valve, heat can be added by the heat change means, such as electric resistance heating, to change the composition from its solid to its liquid states. Heat continues to be applied until it is desired to allow the valve to close. When heat is no longer applied, the cooling from the water flowing through valve removes heat from the phase change compound solidifying it, allowing the spring 104 to expand closing the valve.

Figure 11:
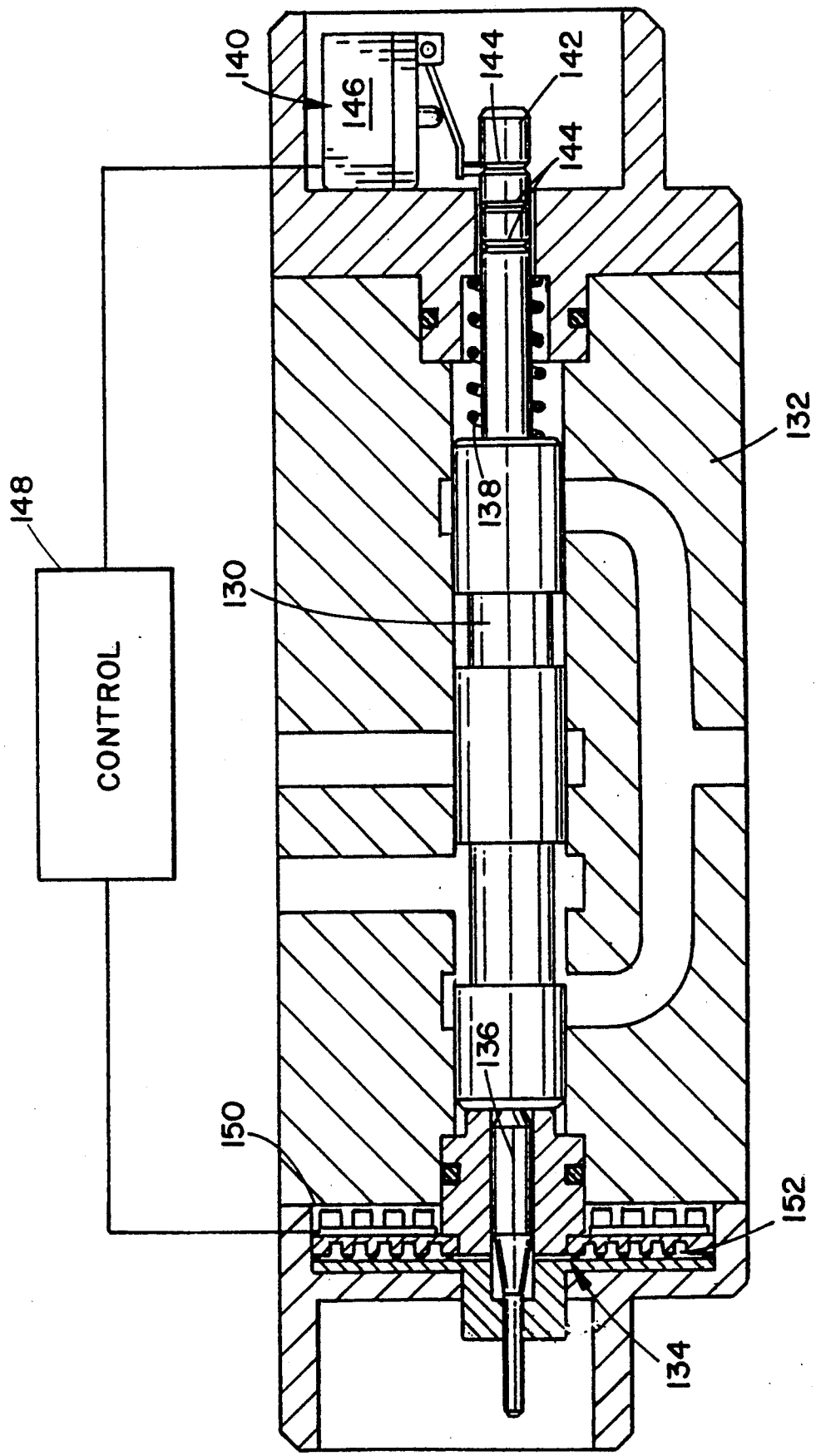
FIG. 11 illustrates a multi-position spool valve controlled by the actuator of FIG. 1 utilizing Peltier heating and cooling.

With reference to FIG. 11, a three-way spool valve is provided. A spool member 130 is slidably mounted in a housing 132. An actuator 134, generally of the construction illustrated in FIGS. 9 and 10, but with longer piston travel has a piston 136 for moving the spool member against a spring 138. In the preferred embodiment, the piston has a tapered surface 136a in a confined chamber, against which the phase change compound presses. A monitoring means 140 monitors the position of the spool member hence the extension of the piston. In the illustrated embodiment, the monitoring means includes a spool extension 142 having recesses 144 for engaging a limit switch 146. When the vessel of actuator 134 is heated, the spindle is moved to the right. When the vessel of actuator 134 is cooled, the spring 138 moves the spool member toward the left.

A control means 148 controls the heat transfer means 150 into and out of a phase change compound holding chamber arrangement 152 in an annular ring around the confined piston chamber of the actuator 134. More specifically in a first, left-most position, the heat transfer means cools the vessel. For a middle position of the spool, heat is applied until the monitor means 140 determines the middle position is reached. The control means causes increased heating and decreased heating (or cooling) in response to the monitoring means determining that the spool is shifting left or right, respectively, from the selected position. For the third, right-most position, the control means 148 causes more heat to be added. When the third position is reached, heating of the vessel is again controlled as necessary to maintain the third position. Analogously, the piston 136 can be controlled to move among and hold at four or more degrees of extension.

Figure 12:
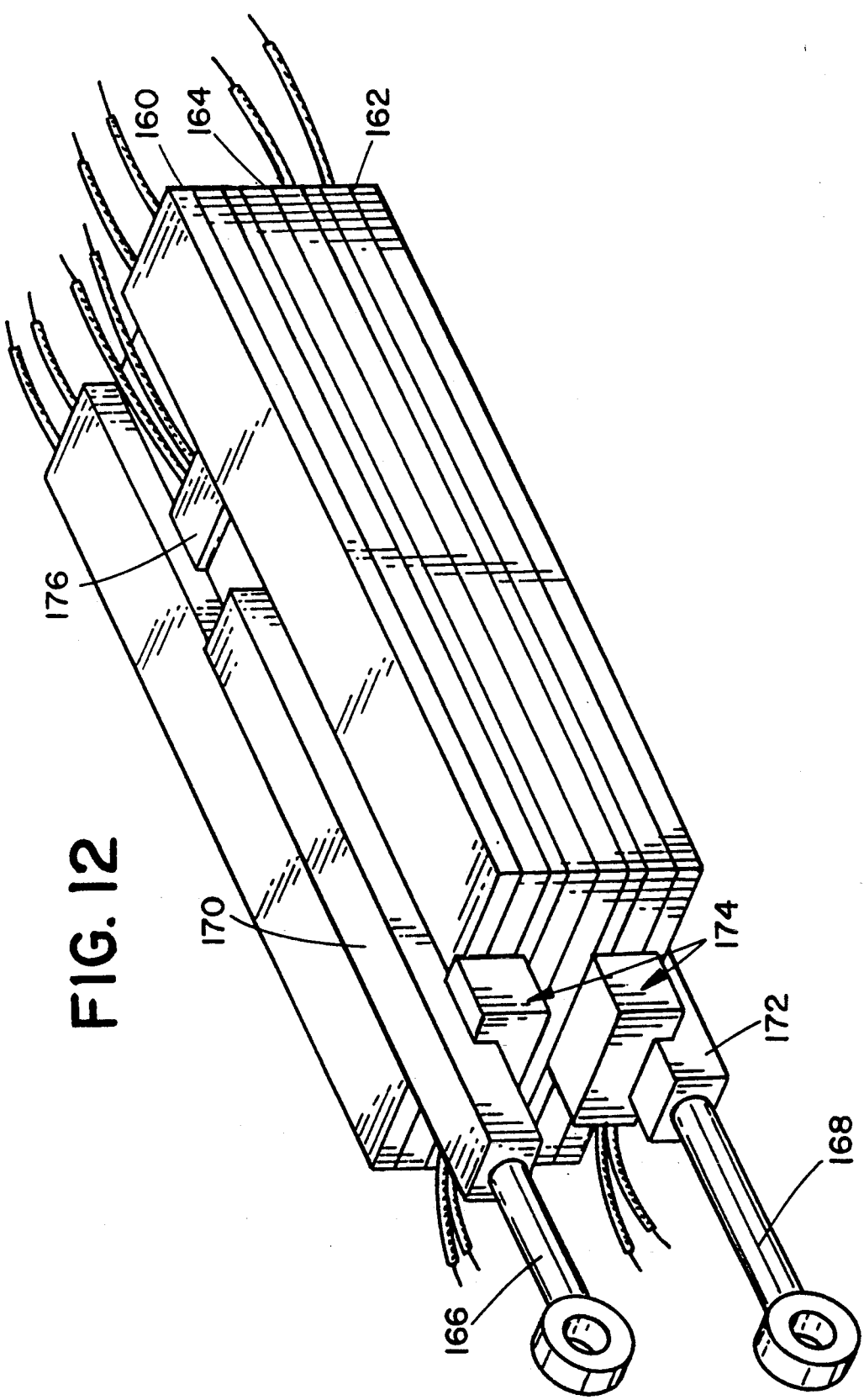
FIG. 12 illustrates a pair of actuators of FIG. 1 mounted to provide differential movement utilizing Peltier heating and cooling.
Figure 13:
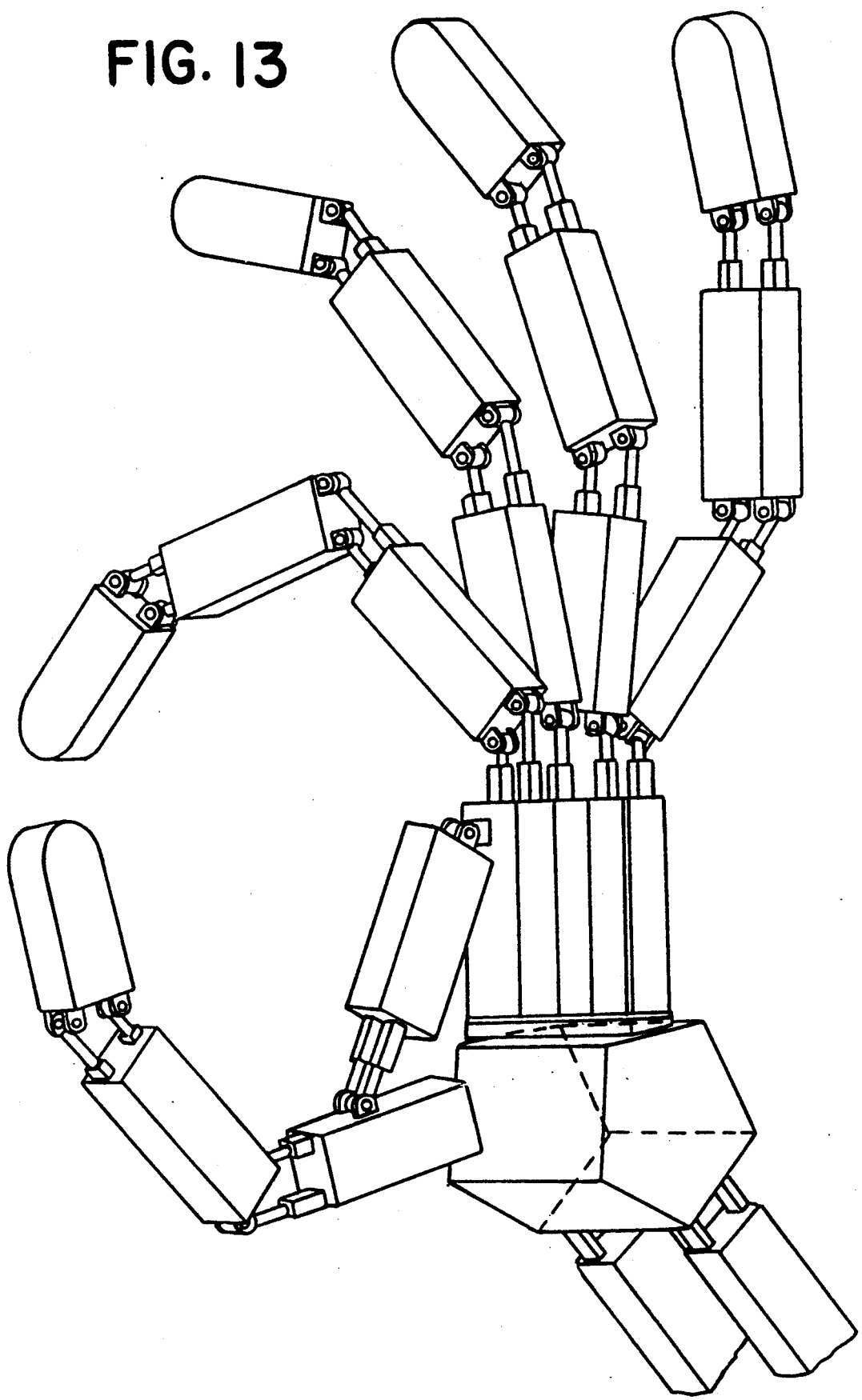
FIG. 13 illustrates a plurality of the actuator pairs of FIG. 12 assembled into a robotic hand.

With reference to FIGS. 12 and 13, a pair of pressure vessels 160, 162 are mounted parallel to each other, with a common temperature transfer means 164 therebetween. Pistons 166, 168 of fluid pressure to mechanical motion converting means 170, 172 associated with each pressure vessel selectively extend and contract. Piston extension sensor means 174 provides an output signal indicative of the degree of relative piston extension. A pressure sensing means 176 senses the pressure within the pressure vessel, hence the pressure with which each piston is being extended. Based on this information, a computer control means selectively supplies electricity to the temperature controlling means 164 to adjust the relative extension and contraction of the pistons. As illustrated in FIG. 13, a multiplicity of these dual piston, dual controlled actuators can be interconnected in various robotic configurations, such as a hand configuration.

Figure 14:
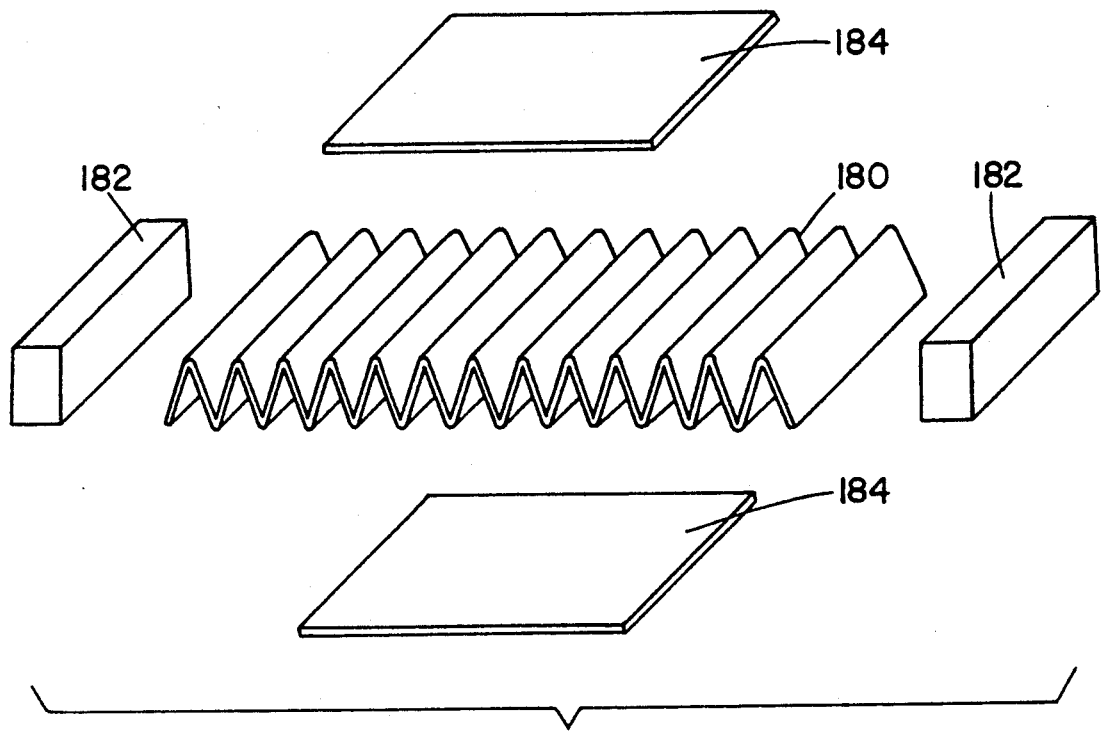
FIG. 14 illustrates an alternate pressure vessel core construction technique; and, FIG. 15 illustrates a pressure vessel core assembled with the technique of FIG. 14.
Figure 15:
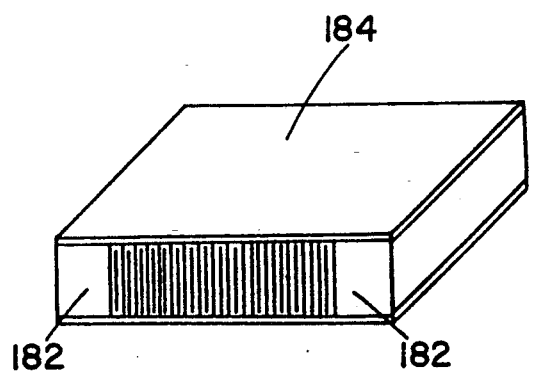

With reference to FIGS. 14 and 15, the pressure vessel A can be fabricated with different techniques. For example, a thin sheet of thermally conductive material 180 such as beryllium copper alloy, is accordion pleated. The accordion pleated sheet is coated with the phase change material and compressed between end blocks 182. Alternately, the phase change material may be drawn in its liquid state into the paths after assembly top and bottom plates 184 are brazed at least to the end blocks and preferably to the pleated sheet for thermal conductivity and strength. The open ends of the compressed accordion pleated sheet are connected with a structure (not shown) that defines a manifold area leading to a piston bore as in FIGS. 1 and 2.

Numerous applications of these actuators readily identify themselves. In the automotive area, actuators can readily be used to control windshield wipers, power seats, power windows, power mirrors, power trunk openers, choke actuators, and other mechanisms which require proportional travel or variable rates of movement. The actuators are also suitable for power trunk latches, gas cap latches, rotating headlamp or headlamp covers, starter solenoids, axle shift devices, inter-axle shift devices, and the like which require merely on/off states.

The actuators also find uses in appliances including a number of directly actuated valves, gravity drain valves, dishwasher drain valves, three-way hydraulic-type valves, metering valves, pressure control valves, washing machine valves, video tape cassette ejection mechanisms, power door openers, ventilation duct damper actuators, ice cube dump mechanisms, zone valves, office equipment, and the like. The actuators can also be adapted for use with a variety of powered hand held devices, such as riveters, embossers, shears, hose crimpers, and the like. The technology is also useful for replacing explosive bolts, expandable rivets, one shot safety brake systems, deployable booms, field swaging operations, fly-by-wire actuators, large hydraulic valve actuators, proportional controllers, robotics, and the like.

The invention has been described with reference to the preferred embodiment. Obviously, modifications and alterations will occur to others upon reading and understanding the preceding detailed description. It is intended to that the invention be construed as including all such alterations and modifications insofar as they come within the scope of the appended claims or the equivalents thereof.

Having thus described the preferred embodiments, the invention is now claimed to be:

1. A high force actuator apparatus which operates at speeds comparable with a solenoid, the actuator apparatus comprising:
   a fluid pressure vessel within which an array of thin paths are defined which paths merge into a manifold region, the thin paths being defined between thermally conductive surfaces spaced a minimal dimension apart;
   a phase change compound which expands and contracts as it changes between solid and liquid states filling the thin paths, the array of thin paths taken together have a total aggregate path length, which total aggregate path length to the minimal dimension has a ratio greater than 10,000:1 such that heat is transferred only short distances of the minimal dimension through the phase change compound as compared with the length and surface area of the thermally conductive surfaces, whereby the phase change medium is heated and cooled to change phase at speeds comparable with solenoid actuation times;
   a fluid pressure to mechanical motion converting means for converting fluid pressure into mechanical movement, the fluid pressure to mechanical movement converting means being connected with the manifold region and constraining the phase change compound to the vessel and the motion converting means.

2. The apparatus as set forth in claim 1 wherein said minimum dimension is less that 0.01 inches.

3. The apparatus as set forth in claim 1 wherein the vessel is constructed of a material which has a thermal conductivity exceeding 70 BTU/hr. ft. °F. and which has a vessel strength exceeding 5,000 PSI.

4. The apparatus as set forth in claim 1 wherein the pressure vessel has exterior walls which are at least as thick as said minimum dimension.

5. The apparatus as set forth in claim 1 wherein the vessel has generally flat opposite wall surfaces and further including a pair of thermoelectric chips mounted against the vessel flat wall surfaces and a pair of heat sinks mounted in thermal communication with the pair of thermoelectric chips, the thermoelectric chips being selectively operable for moving heat back and forth between the vessel and the associated heat sinks.

6. The apparatus as set forth in claim 1 further including a thermally conductive valve housing which defines a valve seat against which a valve member is biased by a spring means, the pressure vessel being mounted to and in thermal communication with the valve housing with the fluid pressure to mechanical motion converting means being operatively interconnected with the valve member for selectively moving the valve member against the spring bias from the valve seat, such that the valve housing provides a heat sink to assist in solidifying the phase change compound.

7. The apparatus as set forth in claim 1 further including:
   a second pressure vessel containing a phase change compound which selectively changes between fluid and solid states and a second fluid pressure to mechanical motion converting means for converting fluid pressure in the second vessel to mechanical movement, the first and second fluid pressure to mechanical movement means being mounted generally in parallel for causing relative, differential mechanical movement;
   first and second heat transfer means being mounted in thermal communication with the first and second vessels for selectively transferring heat;
   a mechanical movement sensing means for sensing a degree of mechanical movement of the first and second fluid pressure to mechanical motion converting means.

8. The apparatus as set forth in claim 7 further including a pressure sensing means operatively connected with the first and second vessels for sensing fluid pressure within the first and second vessels, which fluid pressure is indicative of an amount of force with which the fluid pressure to mechanical motion converting means is applying the mechanical movement.

9. An actuator apparatus comprising:
   a fluid pressure vessel within which an array of thin paths are defined which merge into a manifold region, the thin paths being defined between closely adjacent thermally conductive surfaces;
   a phase change compound which expands and contracts as it changes between solid and liquid states filling the thin paths;
   a piston bore within which a plug of low durometer material is slidably received in contact with the compound, a higher durometer member is slidably received in the bore adjacent the low durometer member, and a piston is slidably received in the bore abutting the high durometer seal, the phase change compound being sealed within the vessel and the piston bore.

10. The apparatus as set forth in claim 9 wherein the array of thin paths taken together have a total aggregate path length, which total aggregate path length to minimum dimension has a ratio greater than 10,000:1.

11. A pressure vessel comprising:
    a body portion having a large plurality of slits cut longitudinally therein to define an array of thin paths having a minimum dimension defined between integrally connected, thermally conductive fin portions, the array of thin paths merging into a manifold region, and further including a plate member affixed to a peripheral wall of the vessel body and the fins to provide thermal conductivity between the fins and the plate portion and to cause a high pressure construction by anchoring the plate to the fins to prevent the plate from buckling under high internal pressures; and
    a phase change compound which expands as it changes between solid and liquid states filling the thin paths.

12. An actuator apparatus comprising:
    a pressure vessel which has an array of thin paths defined in an interior thereof that connect with a manifold region;

a phase change compound which expands as it changes between solid and liquid states filling the thin paths;

a fluid pressure to mechanical motion converting means for converting fluid pressure into mechanical movement, the fluid pressure to mechanical movement converting means being operatively connected with the manifold region to hold the phase change compound therein to create the mechanical movement as the phase change compound expands and contracts within the vessel;

a heating zone;

a cooling zone;

a movable member to which the vessel and the fluid pressure to mechanical motion means are mounted for movement relative to the heating and cooling zone for selectively moving the vessel cyclically therebetween.

13. The apparatus as set forth in claim 12 wherein the heating and cooling zones are fluid reservoirs each arranged along arcuate paths scanning about 180° with fluid seals for blocking intermixing of hot and cold fluid in the heating and cooling zones, respectively, the fluid seals allowing passage of the vessel between the heating and cooling zones, the movable member rotating the vessel through the arcuate heating and cooling zones.

14. The apparatus as ste forth in claim 13 further including an accentric member disposed off-center relative to the heating and cooling zones, the eccentric member being displaced toward one of the fluid seals and wherein the fluid pressure to mechanical movement means includes a cam member which is selectively pressed against the eccentric member causing resultant mocement of the pressure vessel and the mounting means through the heating and cooling zones.

15. An apparatus comprising:

a first pressure vessel having an array of paths therein containing a phase change compound which expands and contracts as it changes between solid and liquid states;

a first fluid pressure to mechanical motion converting means for converting pressure changes in the first vessel into mechanical movement;

a second pressure vessel having an array of paths therein containing the phase change compound;

a second fluid pressure to mechanical movement converting means for converting fluid pressure changes from a phase change compound in the second pressure vessel changing phase from a solid to a fluid state into mechanical movement;

a heat pump means for cyclically (1) taking heat from one of the first and second pressure vessels and another source of heat and (2) supplying the heat to the other of the first and second pressure vessels.

16. The apparatus as set forth in claim 15 wherein the heat pump means includes a first coil thermally connected to the first pressure vessel, a second coil thermally connected with the second pressure vessel, a compressor means connected between the first and second coils and an expansion valve connected between the first and second coils, the compressor means being reversible for selectively compressing a compressible gas and raising its temperature and supplying the raised temperature compressed gas to one of the coils heating the associated vessel, the expansion valve allowing the compressed gas to change phase into a vapor dropping its temperature, the dropped temperature vapor flowing to the other coil absorbing heat from its associated vessel, and returning to the compressor, whereby the heat transfer means selectively moves heat back and forth between the vessels.

17. The apparatus as set forth in claim 16 further including another heat transfer means for selectively moving additional heat to the first and second pressure vessels to replace at least heat energy converted to mechanical work.

18. A valve apparatus comprising:

a spool valve housing within which a valve spool member is slidably mounted;

a fluid pressure vessel within which an array of thin paths are defined which connect with a manifold region;

a phase change compound which expands as it changes between solid and liquid states filling the thin paths;

a fluid pressure to mechanical motion converting means for converting fluid pressure changes in the vessel into mechanical movement, the fluid pressure to mechanical movement converting means being operatively connected with the manifold region and the spool member;

a heat transfer means for selectively transferring heat into and out of the pressure vessel;

a position sensing means for sensing a position of the spool member, the position sensing means being operatively connected with a control means for controlling the heat transfer means such that the spool member is maintained in one of a plurality of selected positions.

19. An actuator comprising:

a fluid pressure vessel which defines an interior volume;

a multiplicity of thermally and electrically conductive surfaces which substantially fill the pressure vessel interior, which conductive surfaces are spaced a minor dimension apart to define thin paths therebetween, the thermally and the electrically conductive surfaces conveying heat quickly into and out of the thin paths and providing an electrical current path;

a phase change compound which expands and contracts as it changes between liquid and solid states, the phase change compound filling the thin paths, the array of thin paths taken together having a total aggregate path length, which total aggregate path length has a ratio to the minor dimension of greater than 10,000:1 such that heat is transferred only short distances of the minor dimension through the phase change compound as compared with a surface area of the thermally conductive surfaces, whereby the phase change medium is heated and cooled rapidly;

a fluid pressure to mechanical motion converting means for converting changes in pressure of the phase change compound within the pressure vessel into mechanical movement.

20. The actuator as set forth in claim 19 wherein the electrically and thermally conductive surfaces include an accordion pleated thin sheet of metal foil.

* * * * *